Jan. 22, 1935.  F. H. KELLEY  1,988,949

SAW FRAME

Filed Aug. 29, 1934

Inventor.
Frederick H. Kelley
by Heard Smith & Tennant.
Attys.

Patented Jan. 22, 1935

1,988,949

UNITED STATES PATENT OFFICE 1,988,949

SAW FRAME

Frederick H. Kelley, Franklin, N. H., assignor to G. W. Griffin Co., Franklin, N. H., a corporation of New Hampshire Application August 29, 1934, Serial No. 741,953

1 Claim. (Cl. 145—33)

This invention relates to saw frames and especially to saw frames for coping saws and the like.

An object of the invention is to provide an improved saw frame of this type which is constructed so that it will hold saw blades having plain ends as well as saw blades having looped ends or pin ends.

The novel features of the invention will be pointed out in the claim.

In the drawing:

Fig. 2 is a fragmentary view with part broken out showing the saw frame as used in connection with a loop-ended saw blade.

Fig. 3 is a similar view showing the saw as used with a saw blade having plain ends.

Fig. 4 is a similar view showing the device as used with a saw having pin ends.

Fig. 5 is a fragmentary view of the end of one arm of the frame.

Fig. 6 is a fragmentary prospective view showing the end of the other arm of the frame.

Figure 1:
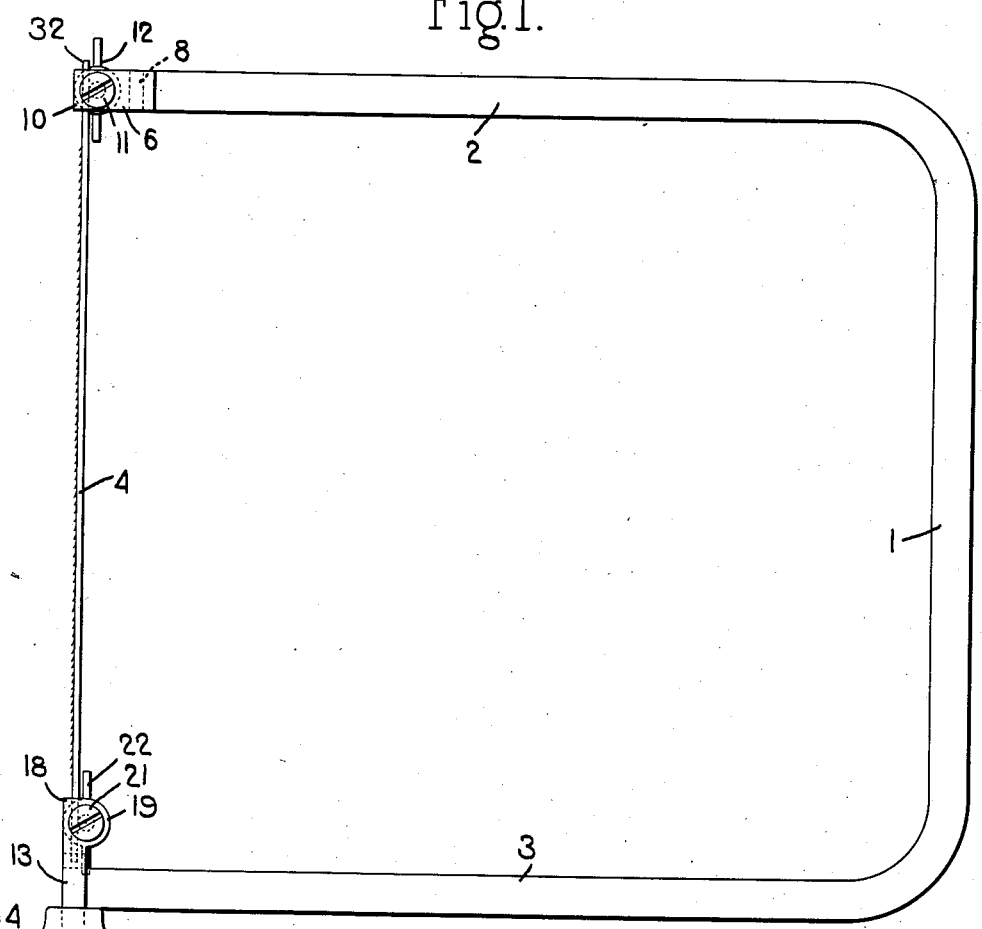
Fig. 1 is a side view of a saw frame embodying my invention.
Figure 1:
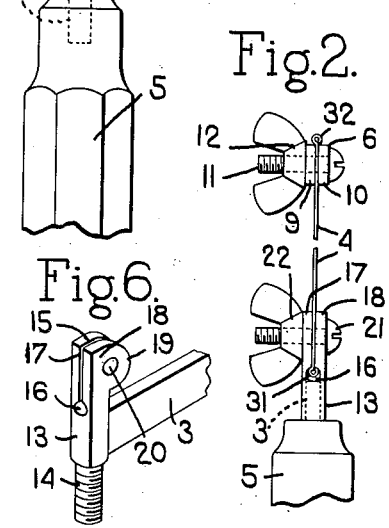
Figure 1:
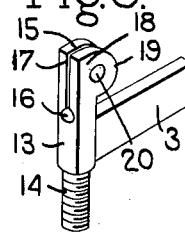
Figure 1:
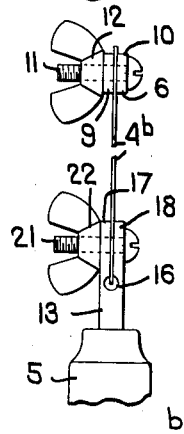
Figure 1:
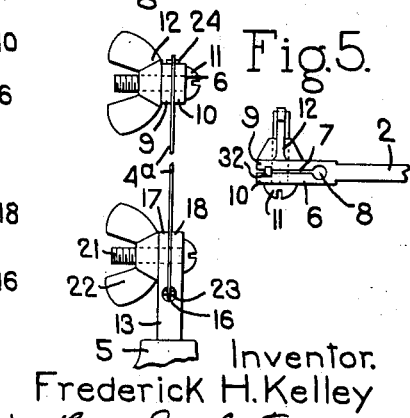

The saw frame, which is indicated generally at 1, has the usual C-shape, it being provided with the upper arm 2 and the lower arm 3. 4 indicates the saw blade, one end of which is attached to the end of the upper arm 2 and the other end of which is attached to the end of the lower arm 3.

5 indicates the handle by which the saw is manipulated and which may have any suitable or usual construction.

The features of the present invention relate to the manner in which the saw blade is secured to the ends of the arms 2 and 3. The frame herein shown is made of flat stock and the end of the arm 2 is thickened somewhat as shown at 6 in Fig. 5 to form a head portion to which the saw blade 4 is secured. This head portion 6 is provided with a blade-receiving slot 7 which extends from the end of the arm inwardly to an opening 8 with which the head 6 is provided. This slot 7 and the aperture 8 form the two clamping jaws 9 and 10 which are capable of slight movement toward and from each other and between which the blade 4 is received. These clamping jaws are adapted to be clamped against the blade by means of a clamping screw 11 which extends transversely through the jaws and which has a clamping nut 12 screw-threaded thereto.

The end of the arm 3 is provided with a clamping head portion 13 which is rigid with said arm and which extends at right angles thereto, the lower end of the head portion having the screw-threaded stem 14 to which the handle 5 may be screwed.

The upper end of the head 13 is provided with a slot 15 which extends from the upper end downwardly to a transverse opening 16. By virtue of this construction, the head 13 will be formed with the two clamping jaws 17 and 18 which are capable of slight movement toward and from each other. These jaws are provided with the lateral extension 19 and with the through opening 20 adapted to receive a clamping bolt 21, the latter having a clamping nut 22 screw-threaded thereto.

If a saw blade having loop ends is to be attached to the frame, then the lower end of the blade will be inserted into the slot 15 (the clamping nut 22 having been loosened to allow the clamping jaws 17, 18 to spring apart slightly), the loop 31 at said lower end of the saw blade being entered into the aperture 16. The upper end of the saw blade is entered into the slot 7 and the arms 2 and 3 will be forced toward each other sufficiently to permit the loop 32 at the upper end of the blade to engage the outer face of the head 6. The clamping nuts 12 and 22 may then be tightened, thereby firmly clamping the blades in the arms of the saw frame.

If a saw blade $4^a$ having a pin end is to be used, as shown in Fig. 4, then the pin 23 at the lower end of the saw blade $4^a$ will be inserted into the opening 16, the lower end of the blade at the same time being entered into the slot 15 and the upper end of the blade being entered into the slot 7 with the pin 24 at the upper end of the blade engaging the outer face of the head 6. The tightening of the clamping nuts 12 and 22 will firmly lock the saw to the frame.

Some saw blades for saws of this type are made with plain ends, that is, without any pins or loops or other projections at the end to interlock with the frame. Such a blade is shown at $4^b$ in Fig. 3. My improved saw frame is adapted for use in holding a blade of this type as well as of the types shown in Figs. 2 and 4. In using a blade $4^b$ having plain ends, the clamping nuts 12 and 22 will be backed off sufficiently to allow the ends of the blades to be entered into the slots 15 and 7. The lower end of the blade will preferably first be placed in the slot 15, as shown in Fig. 3, and the clamping nut 22 tightened to firmly clamp the saw blade between the jaws 17 and 18. The arm 2 of the saw frame is then pressed toward the arm 3 slightly and brought into position so that the upper end of the saw blade can be entered into the slot 7 of the head 6. The clamping nut 12 is then tightened to firmly clamp the upper end of the blade between the jaws 9 and 10. The clamping construction shown is such that a sufficient clamping pressure can be created between the clamping jaws of the heads 6 and 13 and the saw blade to firmly hold the blade in place and prevent it from pulling out from between the clamping jaws.

It will be understood that where a saw blade having loop ends or pin ends is employed, it will not be necessary to tighten the clamping nuts to such an extent as is desirable where a plain-ended saw blade is being used because with the type of saw blades shown in Figs. 2 and 4, the projections at the ends of the blades assist in holding the blades in the arms.

The clamping bolts 11 and 21 are preferably so located that when the saw is placed between the two pairs of clamping jaws with the back of the saw against the clamping bolts, the saw will be properly positioned in the axial line of the handle. This location of the saw blade relative to the handle is advantageous when sawing a block of wood to produce a shape having sharp angles. While I have illustrated herein a selected embodiment of my invention, I do not wish to be limited to the constructional features shown.

I claim:

A saw frame having a C-shaped frame body, the end of one arm of which is split thereby providing a pair of blade-clamping jaws which are integral with the arm, the end of the other arm having a head integral therewith extending at right angles thereto, the inner end of the head being split to provide two blade-clamping jaws integral therewith and the outer end of the head being screw-threaded, clamping bolts co-operating with each pair of clamping jaws to clamp a saw blade therebetween and a handle screw-threaded to the screw-threaded portion of the head.

FREDERICK H. KELLEY.